Figure 1:
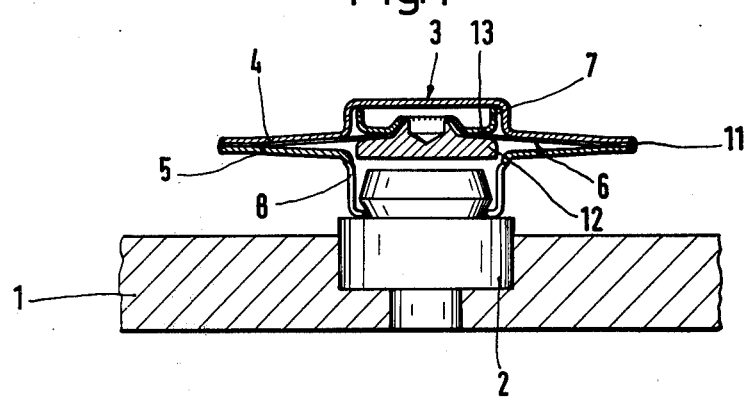

United States Patent [19]

Klann et al.

[11] 4,161,278

[45] Jul. 17, 1979

[54] THERMALLY-CONTROLLED VALVE FOR A STEAM TRAP

[75] Inventors: Holm Klann; Josef Lingnau, both of Bremen, Fed. Rep. of Germany

[73] Assignee: GESTRA-KSB Vertriebsgesellschaft mbH & Co., Bremen, Fed. Rep. of Germany

[21] Appl. No.: 799,482

[22] Filed: May 23, 1977

[30] Foreign Application Priority Data

Jul. 3, 1976 [DE] Fed. Rep. of Germany ....... 2630038

[51] Int. Cl.² .............................................. F16T 1/02
[52] U.S. Cl. .................................. 236/56; 92/103 M; 236/99 R
[58] Field of Search ......................... 236/58, 56, 99 R; 251/331; 92/98 R, 103 M

[56] References Cited

U.S. PATENT DOCUMENTS

| | | | |
|---|---|---|---|
| 1,783,281 | 12/1930 | Cox | 251/331 X |
| 2,289,020 | 7/1942 | Jones | 236/58 |
| 2,654,559 | 10/1953 | Franck | 251/331 |
| 2,725,221 | 11/1955 | Boteler | 251/331 X |
| 2,822,134 | 2/1958 | Kunzler et al. | 236/99 R |
| 3,078,066 | 2/1963 | Moore | 137/510 X |
| 3,191,863 | 6/1965 | King et al. | 236/99 R |
| 3,698,633 | 10/1922 | Lingnau | 236/99 R |
| 4,013,220 | 3/1977 | Zoller | 236/56 |

Primary Examiner—William E. Wayner
Assistant Examiner—William E. Tapolcai, Jr.
Attorney, Agent, or Firm—Allison C. Collard; Thomas M. Galgano

[57] ABSTRACT

A thermally-controlled valve for a steam trap and the like, includes a thermally-controlled element including generally plate-like outer and inner wall portions and a generally plate-like, resilient membrane member disposed between and welded at its outer edges to the wall portions. The outer wall portion and the membrane define therebetween a chamber for accommodating an expanding medium and a reciprocably movable locking member is disposed generally between the membrane member and the inner wall portion, and is disposed for cooperative engagement with the valve seat of the steam trap. The membrane member is coupled to the locking member to effect movement of the locking member relative to the valve seat, and is comprised of a plurality of superimposed membrane lamellae, which permits proper functioning of the valve under high operating pressures.

2 Claims, 2 Drawing Figures

THERMALLY-CONTROLLED VALVE FOR A STEAM TRAP

The invention relates to a thermally-controlled valve for a steam trap. More particularly, it relates to such a valve having a membrane member consisting of a plurality of lamellae for opening and closing the valve in response to temperature changes.

Steam traps having a membrane acting as the stroke element for the thermal control member are well known. However, the use of such steam traps is limited exclusively to relatively low operating pressures. A disadvantage exists in these membranes in that, during high operating pressures, a membrane which has to be dimensioned in accordance with the higher operating pressures, is too stiff, as a result of which it impairs a proper temperature-dependent functioning of the steam trap. The stiffness of the membrane cannot even be eliminated by corrugation. On the other hand, membranes having sufficient flexibility did not have a sufficiently long life span.

It is therefore an object of the invention to provide a valve for a steam trap of the aforementioned type having a membrane member which functions properly under high operating pressures and, at the same time, has a longer life span.

This object of the invention is obtained by the provision of a thermally-controlled valve for a steam trap, which consists of a plurality of thin membrane lamellae, instead of a single thick membrane, which operates effectively under high operating pressures, which has an increased expected life span, and which also afford required flexibility necessary for a proper functioning thereof.

Other objects and features of the present invention will become apparent from the following detailed description when taken in connection with the accompanying drawing, which discloses a single emodiment of the invention. It is to be understood that the drawing is designed for the purpose of illustration only, and is not intended as a definition of the limits and scope of the invention disclosed.

Figure 2:
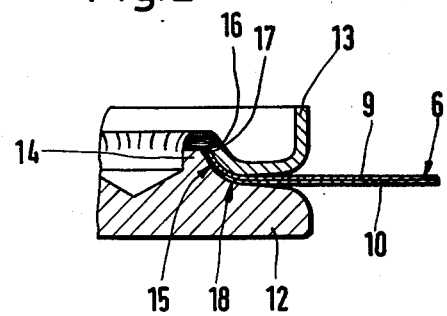

In the drawing, wherein similar reference numerals denote similar elements throughout the several views:

FIG. 1 is a sectional view of the thermally-controlled valve of the steam trap embodying the present invention in an installed position; and FIG. 2 is a fragmentarily-illustrated, enlarged sectional view of the device shown in FIG. 1.

Turning now in detail to the drawing and, in particular, to FIG. 1 thereof, a valve bushing 2 is rigidly mounted into the separating wall 1, forming the pre-pressure and low-pressure side of the steam trap housing (not shown), onto which a thermally-controlled element 3 is mounted. A membrane member 6 is mounted between two, plate-like wall portions 4,5 of control element 3. The upper wall portion 4 forms a receiving chamber 7, together with membrane member 6, to receive an expanding medium, while the lower wall portion 5 is provided with stop claws 8 for mounting the control element 3 on valve seat bushing 2.

As can be seen from FIG. 2, membrane member 6 consists of two, superimposed thin membrane lamellae 9,10. These lamellae are sealingly welded together at their edges 11 between wall portions 4,5.

In addition, a locking member 12, which cooperates with valve seat bushing 2, as well as a clamping disk 13 mounted in receiving chamber 7, are coupled to the two membrane lamellae 9,10. The locking member 12 is provided with a central annular shoulder 14, having a truncated cone-like circumferential face 15. Clamping disk 13, as well as membrane lamellae 9,10, are provided wth a central bore 16 or 17, respectively, and the adjacent front face zone of disk 13 is complimentary-shaped with respect to the circumferential face 15 of locking member 12. In addition, membrane lamellae 9,10 are securely clamped in the lower portion 18 of shoulder 14 between the locking member 12 and clamping disk 13. For this purpose, clamping disk 13, membrane lamellae 9,10, as well as locking member 12, are securely welded together at their shoulder edges or bore edges, respectively.

The front faces of clamping disk 13 and locking member 12, which run toward each other and run outwardly from lower portion 18 in a diverging manner, act as supporting faces for membrane lamellae 9,10, in the two end-stroke positions thereof.

The welding provides a reliable sealing at the connecting locations of parts 9,10,12,13. Furthermore, the welding acts as a maintenance force for maintaining the clamping force in clamping zone 18. By providing annular shoulder 14 on locking member 12, easy access for the welding beam is made possible, so as to permit welding of the edges of all parts 9, 10, 12, 13, despite the presence of the two superimposed lamellae 9, 10. Tensions which may occur during welding can be dissipated in radial expansions in the truncated, cone-shaped sections of parts 9, 10, 12, 13 and, therefore, tensioning does not occur in the planar portions of membrane lamellae 9,10, which would be more readily subject to rupture. Mounting of the membrane lamellae in this manner, greatly increases the life span thereof.

Forming the membrane member 6 from two or, if so desired, a plurality of membrane lamellae 9, 10, permits operation of the steam trap without any difficulties, notwithstanding higher operating pressures, i.e., the required long life span and required proper functioning of the steam trap is assured, due to the required flexibility of the membrane members.

While only a single embodiment of the present invention has been shown and described, it will be obvious to those persons of ordinary skill in the art, that many changes and modifications may be made thereunto, without departing from the spirit and scope of the invention.

What is claimed is:

1. A thermally-controlled valve for a steam trap and the like, having a valve seat, comprising:
    a thermally-controlled element including an outer wall portion, an inner wall portion, and a flexible separating wall therebetween, said flexible separating wall comprising a plurality of superimposed membrane lamellae which flex together in the same direction, the outer edges of which and said wall portions are exclusively rigidly welded together, said separating wall and said outer wall portion defining therebetween a receiving chamber for accomodating an expanding medium, said element also including a clamping disk disposed within said chamber and a reciprocably-movable locking member disposed between said separating wall and said inner wall portion for cooperative engagement with the valve seat, said membrane lamellae being rigidly clamped between said clamping disk and said locking member to effect movement of said locking member relative to the valve seat, said locking member having a central cavity and an annular shoulder having an outer generally truncated, cone-shaped circumferential surface which surrounds said cavity and abuts said separating wall and wherein said clamping disk and said membrane lamellae are provided with correspondingly disposed central bores, and complimentary-shaped surfaces opposite said outer circumferential surface of said annular shoulder, said locking member, clamping disk, and membrane lamellae being exclusively rigidly welded together at their adjacent bore or shoulder edges, respectively.

2. The valve according to claim 1, wherein said clamping of said membrane lamellae occurs at the lowest portion of said outer circumferential surface of said annular shoulder.

* * * * *